United States Patent [19]

Vogel et al.

[11] Patent Number: 4,543,797
[45] Date of Patent: Oct. 1, 1985

[54] DEGRADATION SENSING AND SHUT-DOWN MEANS FOR REFRIGERATION MOTOR-COMPRESSOR UNITS

[75] Inventors: Richard E. Vogel, Cincinnati; Benjamin Bowsky, Maineville, both of Ohio

[73] Assignee: Emerson Electric Co., St. Louis, Mo.

[21] Appl. No.: 652,839

[22] Filed: Sep. 21, 1984

Related U.S. Application Data

[62] Division of Ser. No. 499,321, May 31, 1983, Pat. No. 4,490,988.

[51] Int. Cl.⁴ .............................................. F25B 31/00
[52] U.S. Cl. ...................................... 62/193; 361/178
[58] Field of Search ................ 62/193, 192, 468, 475, 62/84; 184/6.4, 108; 123/196 S; 340/604, 631; 361/104, 178; 307/118, 308, 252 J, 301; 137/392

[56] References Cited

U.S. PATENT DOCUMENTS

| | | | |
|---|---|---|---|
| 2,552,088 | 5/1951 | Davis | 361/178 |
| 3,959,980 | 6/1976 | Hamilton | 62/126 |
| 3,959,984 | 6/1976 | Vlasak | 361/104 X |

Primary Examiner—William E. Wayner
Assistant Examiner—John Sollecito
Attorney, Agent, or Firm—Charles E. Markham

[57] ABSTRACT

Means for continuously shut-down operation of and enclosed motor-compressor unit for refrigeration or heat pump service when the refrigerant-oil mixture therein reaches a predetermined degree of contamination by conductive particles comprises the provision of a normally closed switch in the motor energizing circuit, a relay which when energized opens the switch, in immersing a pair of spaced electrodes in the mixture, in connecting the electrodes and a capacitor in series across a D.C. power source, in connecting a unidirectional solid state switch and the relay in parallel with the electrodes and capacitor and in providing voltage responsive gating means for turning on the switch in response to a predetermined charge on the capacitor, and in the provision of a normally open fusible switch responsive to fuse and close in response to a predetermined high motor temperature and through relay means opens a second normally closed switch in the motor energizing circuit.

3 Claims, 6 Drawing Figures

DEGRADATION SENSING AND SHUT-DOWN MEANS FOR REFRIGERATION MOTOR-COMPRESSOR UNITS

This application is a division of pending application Ser. No. 06/499,321 now U.S. Pat. No. 4,490,988 filed May 31, 1983.

This invention relates to the sensing of electrically conductive contaminant particles in the refrigerant-oil mixture in enclosed motor-compressor units for refrigeration or heat pump service and to means for continuously shutting-down operation of the unit when contamination reaches a predetermined degree.

BACKGROUND OF THE INVENTION

Contamination of the refrigerant-lubricating oil mixture in the lower portion or sumps of the encasements of hermetically sealed or semi-sealed motor-compressor units employed in air conditioning or heat pump service increases with the length of service. This contamination consists for the most part of electrically conductive particles such as metal chips or carbon particles and may include semi-conductive particles or charged ions from lubricant or refrigerant breakdown. When contamination reaches a sufficient level or degree it causes malfunctioning of the compressor, clogging of the refrigerant lines and undue loading and overheating of the driving motor to the extent that a hazardous condition may result. Motor manufacturers usually provide recycling overtemperature switches of the bimetal type installed in the motor stator to provide a temporary shut-down of the motor until it cools sufficiently.

But such recycling switches merely prolong a hazardous condition because usually in most instances the operation of the unit is infrequently monitored. When degradation of the unit as reflected in contamination of the refrigerant-oil mixture reaches a level indicative of a hazardous condition or indicative that the unit is nearing the end of its useful life a continued shut-down of the unit is essential. On the other hand an undesirable level of contamination may occur early in the service of the unit or at least substantially before the end of its useful life. In such instances and wherein the encasement of the unit is such that it is practical to replace the contaminated refrigerant-oil mixture a more discriminating means for determining a lesser level of contamination and effecting in response thereto a continued shut-down of the unit is desirable.

It is an object of this invention to provide a generally new and improved means for effecting the continued shut-down of operation of a motor-compressor unit in response to a predetermined level of contamination of the refrigerant-oil mixture.

More specifically it is an object to provide a D.C. power source and circuit means connecting a pair of spaced electrodes immersed in the refrigerant-oil mixture and a capacitor in series therewith across the power source and means including unidirectional solid state switching and D.C. relay means operative to continuously break the motor energizing circuit in response to a predetermined charge on the capacitor.

Further objects and advantages will appear when reading the following description in connection with the drawings.

IN THE DRAWINGS

DESCRIPTION OF A PREFERRED FORM OF THE INVENTION

Figures 1, 2, 3, 4, 5, 6:
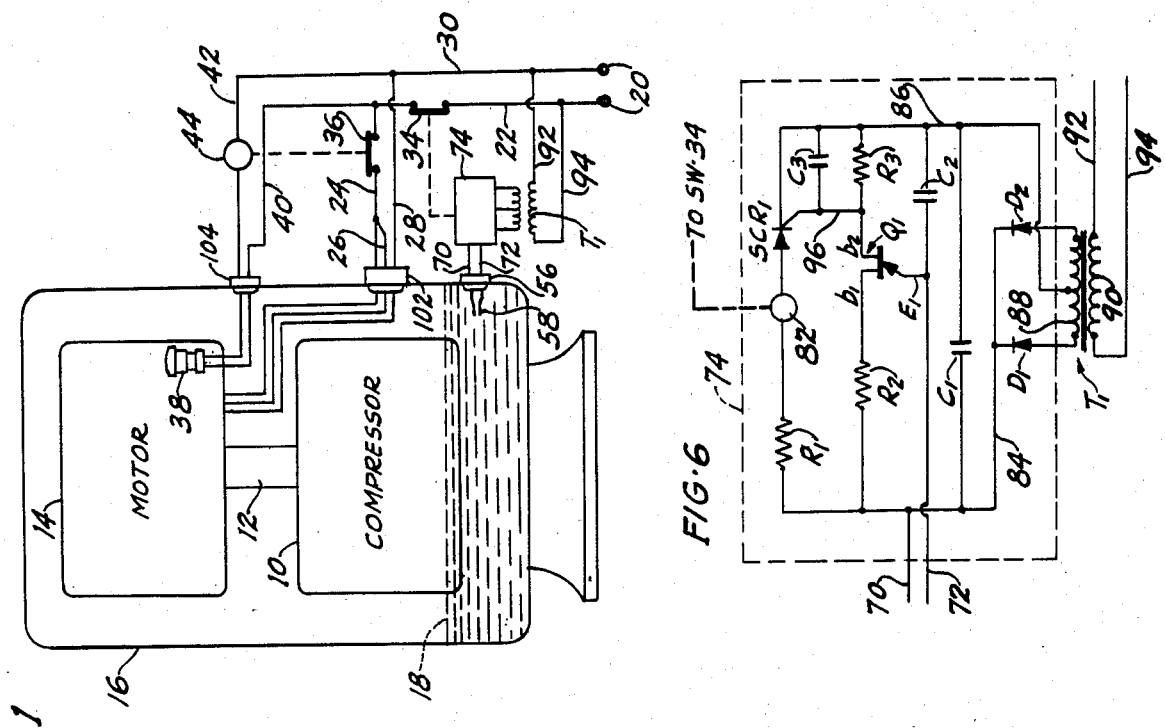
FIG. 1 is a diagrammatic illustration of typical hermetically sealed motor-compressor unit for air conditioning or heat pump service including a motor energizing circuit and incorporating contamination and high motor temperature sensing means with circuit breaking relays constructed in accordance with the invention.
FIG. 2 is a bottom plan view of the encapasulated feasible switch shown alone.
FIG. 3 is a longitudinal cross-sectional view of the fusible switch taken along lines 3—3 of FIG. 2.
FIG. 4 is an exterior elevational view of the contaminant sensor shown alone.
FIG. 5 is a longitudinal cross-sectional view of the contaminant sensor taken along lines 5—5 of FIG. 4.
FIG. 6 is a wiring diagram for accumulating and amplifying sensor signals.

Referring to FIG. 1, a motor-compressor unit for air conditioning or heat pump service comprises a compressor 10 driven through a shaft 12 by a motor 14 positioned above the compressor. The unit is enclosed in a casing 16. Numeral 18 indicates a mixture of liquid refrigerant and lubricating oil which conventionally accumulates in the lower portion or sump of the casing 16 which encloses the motor-compressor unit. The starting and running windings of motor 14 (not shown) are connected across A.C. power source terminals 20 through leads 22, 24, 26 and 28 and 30. There is a normally closed relay operated switch 34 in the lead 22 and a normally closed relay operated switch 36 in the lead 24.

Positioned in good heat transfer relationship with motor 14, as in its stator, is a normally open, encapsulated, fusible switch device 38 which is connected in parallel with the windings of motor 14 by leads 40 and 42. There is a relay 44 connected in lead 42 which when energized opens the normally closed switch 36 to continuously break the energizing circuit for the windings of motor 14. The fusible switch device 38, shown alone in FIGS. 2 and 3 comprises an open ended hollow cylindrical metal casing 46, arranged vertically and having an intermediate internal shoulder formed therein supporting a relatively thick disc shaped member 48 constructed of an electrically conductive alloy compounded to melt at a predetermined temperature. The upper and lower ends of casing 46 are sealed by glass discs 50 and 54 and a pair of vertically arranged and horizontally spaced electrodes or contacts 52 extend from the exterior through the glass wall 54 into the lower portion of the casing 46.

The interiorly projecting end portions of electrodes 52 are spaced vertically below the alloy disc 48 and the exteriorly projecting end portions thereof are suitably connected to the circuit leads 40 and 42. The fusible switch 38 being mounted in a vertical position as shown, with the fusible alloy disc 48 above the horizontally spaced electrodes, closes an energizing circuit for relay 44 to effect the opening of switch 36 when alloy disc 48 melts and bridges the electrodes 52 below as a result of a predetermined high temperature attained by motor 14. It will be noted that in this arrangement there is no electrical power consumption until and unless fusible switch 38 closes in response to an overheated motor.

The contaminant sensor, generally indicated at 56 in FIG. 1, and shown in detail in FIGS. 4 and 5, is provided for sensing the degree of contamination of the refrigerant-oil mixture 18 which accumulates in the lower portion of casing 16. The sensor 56 comprises a pair of spaced electrodes 58 which extend through the casing wall and are positioned so as to be immersed in the mixture. The electrodes 58 are supported in a metal cup shaped member 60. The member 60 is fitted into an aperture in the wall of the casing 16 and has its sidewall welded to the casing wall as shown at 62. The bottom of the cup member 60 has two spaced apertures formed therein with interiorly extending and surrounding sidewalls 64 through which electrodes 58 extend interiorly and exteriorly of the casing 16 and are sealed therein by glass as indicated at 66.

The exteriorly extending portions of electrodes 58 extend through spaced pedestals of a hard rubberlike disc member 58 bonded to the exterior surface of the bottom of cup member 60. The exteriorly extending ends of electrodes 58 are connected by suitable means to the leads 70 and 72 of a signal accumulating and amplifying network indicated at 74 and shown diagrammatically in FIG. 6 within the dotted line enclosure 74.

With reference to FIG. 6, a D.C. relay indicated at 82 when energized opens the normally closed switch 34 to break the energizing circuit for the windings of motor 14 and thereby continuously shut-down operation of the motor-compressor unit. Relay 82 is connected in series with and between a resistor $R_1$ and a silicon controlled rectifier $SCR_1$ across a relatively low voltage D.C. power source through leads 84 and 86. The D.C. power source comprises a transformer $T_1$ having a secondary winding 88 both ends of which are connected to the lead 84 through rectifying diodes $D_1$ and $D_2$, the return lead 86 being connected to the center of secondary winding 88. There is also a filtering capacitor $C_1$ connected across leads 84 and 86. Transformer $T_1$ also includes a primary winding 90 connected across the A.C. power supply by leads 92 and 94.

One of the immersed electrodes 58 of the contaminant sensor 56 is connected by a lead 70 to the lead 84 and the other of the electrodes 58 is connected by a lead 72 to lead 86 through a capacitor $C_2$. A gating network for the $SCR_1$ comprises a unijunction transistor $Q_1$ (or double base diode) having one base $b_1$ connected to lead 84 through a resistor $R_2$ and its other base $b_2$ connected to lead 86 through a resistor $R_3$. The emitter $E_1$ of transistor $Q_1$ is connected to lead 72 between capacitor $C_2$ and the other electrode 58. A lead 96 also connects the base $b_2$ of transistor $Q_1$ with the control electrode of $SCR_1$ and a capacitor $C_3$ is connected between lead 96 and lead 86.

The refrigerant-oil mixture is conventionally constantly circulated by a lubricating pump in motor-compressor units of this kind so that conductive or semiconductive contaminating particles may bridge the sensor electrodes 58 only momentarily. However, the capacitor $C_2$ is a low leakage capacitor and when contamination of the mixture attains a degree wherein conduction across the electrodes 58 causes a voltage buildup on capacitor $C_2$ and consequently the emitter $E_1$ which is greater than the voltage applied to base $b_1$ through resistor $R_2$ the transistor $Q_1$ will be forward biased.

Transistor $Q_1$ will now conduct and capacitor $C_2$ will discharge therethrough and apply a strong gating pulse to $SCR_1$ via emitter $E_1$ across the PN junction to base $b_2$ and thence through lead 96 to the control electrode of $SCR_1$. The capacitor $C_3$ connected between lead 96 and lead 86 then acts to prolong the gating pulse to assure the turn on of $SCR_1$. Once $SCR_1$ is turned on it continues to conduct and the D.C. relay 82 is continuously energized and normally closed switch 34 is opened thereby to continuously shut-down operation of the motor-compressor unit. The term "continued shut-down" as used herein means that shut-down of the motor-compressor unit will continue until and unless fuses, when employed to effect shut-down, are replaced or reset and/or the contaminated refrigerant-oil mixture is replaced when the cause of the shut-down.

The devices indicated at 102 and 104 for the sealed passage of leads 24, 26 and 28 to the motor windings and of leads 40 and 42 to fusible switch 38 through the casing wall 16 may be of a construction similar to that shown in FIG. 5 for sealing the passage of electrodes 58 through the wall.

We claim:

1. In an enclosed motor-compressor unit for air conditioning or heat pump service which includes an accumulation of refrigerant-oil mixture in the enclosure, an A.C. electrical power source, circuit connections including a normally closed switch connecting the motor of said unit across said A.C. power source, a relay which when energized opens said normally closed switch thereby to shut-down operation of said unit, means for continuously energizing said relay when contamination of said mixture by conductive particles therein attains a predetermined degree comprising: a source of D.C. electrical power, a silicon controlled rectifier, circuit connections connecting said silicon controlled rectifier and said relay in series across said D.C. power source, a contaminant sensor comprising a pair of spaced electrodes immersed in said mixture, a capacitor, circuit connections connecting said electrodes and said capacitor in series across said D.C. power source, and voltage responsive means for turning on said silicon controlled rectifier when a predetermined charge is attained on said capacitor.

2. The combination of a motor-compressor unit and continuous shut-down means therefore claimed in claim 1 in which said voltage responsive means is a unijunction transistor having its bases connected across said D.C. power source through a calibrating resistor, and having one base connected to the electrode of said silicon controlled rectifier and having its emitter connected to said capacitor at a point between said electrodes and said capacitor.

3. The combination of a motor-compressor unit and continuous shut-down means therefor claimed in claim 1 in which said D.C. power source is derived from said A.C. power source via a transformer having its primary winding connected in paralled with said normally closed switch and having the output of its secondary winding rectified and filtered.

* * * * *